(12) United States Patent
Seide

(10) Patent No.: US 6,371,750 B1
(45) Date of Patent: Apr. 16, 2002

(54) DEVICE FOR SMOOTHING AND COOLING OR COOLING OF AN EXTRUDED MATERIAL SHEET

(76) Inventor: Adolf Seide, Drachenfelsstrasse 3, D-53721 Siegburg (DE)

(*) Notice: Subject to any disclaimer, the term of this patent is extended or adjusted under 35 U.S.C. 154(b) by 0 days.

(21) Appl. No.: 09/412,222

(22) Filed: Oct. 5, 1999

(30) Foreign Application Priority Data

Oct. 5, 1998 (DE) .......................................... 198 45 652

(51) Int. Cl.$^7$ .............................................. B29C 47/88
(52) U.S. Cl. ...................... 425/371; 100/307; 100/312; 425/327
(58) Field of Search ................................ 425/371, 327; 100/307, 311, 312, 154

(56) References Cited

U.S. PATENT DOCUMENTS

| | | | |
|---|---|---|---|
| 4,046,850 A | * 9/1977 | Kato et al. .................. | 425/371 |
| 4,417,865 A | * 11/1983 | Pfeiffer ....................... | 425/371 |
| 4,619,195 A | * 10/1986 | Held .......................... | 100/154 |
| 4,626,187 A | * 12/1986 | Kamada ...................... | 425/371 |
| 4,997,358 A | 3/1991 | Perkins et al. | |
| 5,200,129 A | * 4/1993 | Kobayashi et al. .......... | 425/371 |
| 5,445,701 A | * 8/1995 | Koba et al. ................. | 425/371 |
| 6,048,436 A | * 4/2000 | Haupt et al. ................ | 425/371 |
| 6,159,334 A | * 12/2000 | Uno ........................... | 425/371 |

FOREIGN PATENT DOCUMENTS

| | | |
|---|---|---|
| DE | 35 30 309 A1 | 2/1987 |
| DE | 195 05 951 A1 | 8/1997 |

* cited by examiner

*Primary Examiner*—James P. Mackey
(74) *Attorney, Agent, or Firm*—Harness, Dickey & Pierce, P.L.C.

(57) ABSTRACT

A device for smoothing and cooling of a material sheet (8) of thermoplastic, especially a film or sheet which are processed into plates which have been extruded by an extruder via a sheet die. Two pairs of units (2, 3; 4, 5) are provided which oppose each other and act on the surfaces (9, 10) of the material sheet (8). The units each have an active area (11) to contact the material sheet (8) forming part of the metal belt (12). The lower surface of the metal belt (12) is coolable in areas below the active area (11). The metal belt (12) is guided over a driving roll (20), which is drivable. The units provide a universal temperature profile, which is achieved over the thickness of a material sheet (8) while cooling and smoothing the sheet. Accordingly, stress differences are prevented.

10 Claims, 5 Drawing Sheets

DEVICE FOR SMOOTHING AND COOLING OR COOLING OF AN EXTRUDED MATERIAL SHEET

CROSS-REFERENCE TO RELATED APPLICATION

This application is based upon and claims priority to German Patent Application 198 45 652.2 filed Oct. 5, 1998, which application is herein expressly incorporated by reference.

BACKGROUND OF THE INVENTION

The invention relates to a device for smoothing and cooling or for cooling of a sheet material, especially a film. The sheet may be processed into plates made from thermoplastics. The sheet of film is extruded by a sheet die extruder.

DE 35 30 309 A1 discloses a procedure and a device for continuously manufacturing thermoplastic sheets. A known dual-band press is proposed as a device to carry out the procedure of calibrating and smoothing. In the reaction zone, the surface pressure is applied to the thermoplastic sheet. Here, a device is present to at least partly take up heat from the thermoplastic sheet. The press bands are arranged one above the other, and are respectively guided via two deflecting rolls. The plastic melt exits the extruder die on a press belt or is introduced into the gap between the deflecting rolls. A pressing plate is arranged between the two deflecting rolls. Furthermore a mechanical pressure transmission is provided. Here, stationary metal rolls are mounted between the pressing plate and the lower surface of the press belt. The pressing plate is adjusted, with the help of hydraulic cylinders, so that the rolls are pressed against the lower surface of the pressing plate. The desired pressure acts on the plastic sheet. In a second embodiment, strip-like heat conducting elements are inserted into the pressing plate. The heating elements are made from copper and contact the lower surface of the pressing plate. Several of these elements are provided in parallel. These in the whole are surrounded by a seal. Thus, the gap between the elements can be pressurized by a pressure medium. Oil and air are used as a pressure medium.

In this device, one disadvantage is that, due to the relatively large diameter of the deflecting rolls, the melt has to travel a relative long path until it reaches the area, where the press bands are supported by the pressing plates. Another disadvantage is, due to the strip-like copper strips or rolls, or the press-on elements, only a small contact area is provided to cool the metal belt and, in turn, the material sheet. Furthermore, the chosen support is not suitable to keep an accurate gap, as no accurate gap adjustment can be made with the pressure medium. Further in a construction where rolls, which only support line-like areas, are provided for the support, a gap adjustment can only take place in the areas between the rolls. This is especially disadvantageous with foamed plastics. Accordingly, sufficient surface quality cannot be achieved.

DE 196 05 951 A1 discloses a smoothing device. Here, the inlet gap facing the sheet die is formed between a smoothing roll and a metal belt. The belt runs continuously around two deflecting rolls. The two deflecting rolls are arranged next to the smoothing roll. A cooling unit can be arranged inside the continuous metal belt. This cooling unit can be provided in addition to deflecting rolls provided to serve as cooling rolls. Also, cooling units can be provided and the deflecting rolls without cooling possibilities.

U.S. Pat. No. 4,997,358 discloses a smoothing device. Several rolls are present to smooth and cool the melt liquid material sheet made from thermoplastic extruded from an extruder via a sheet die. The rolls are arranged in a frame. Since the plastics have to be processed into material sheets, an adjustment needs to be made in the guide for the desired tolerance of thickness. The holding time of the material sheet in contact with the rolls, a stationary roll and two adjustable rolls, can set by fixing the two adjustable rolls around the stationary roll at different angle positions by bolt connections. The fixing takes place via existing bores. The material sheet is guided after exiting the sheet die around part of the circumference of the rolls. Thus, during passing-over from one roll to the next, a change of mating surfaces takes place. First a cooling of one of the surfaces of the material sheet takes place. Next, a cooling of the other surface of the material sheet takes place. Furthermore, only angular contacts are possible which, in the maximum, amount to 180° of the rolls.

One disadvantage of such embodiment is that an asymmetrical temperature profile can occur in the sheet. This leads to a worse transparency in plastic sheets or plastic film. Changes in the microstructure take place with the temperature change. Accordingly, different microstructures are achieved across the thickness of the film or sheet. This leads to the problem that no exactly flat sheets can be produced. The sheets show differences.

SUMMARY OF THE INVENTION

It is an object of the invention to provide a device for smoothing and cooling or cooling a material sheet extruded by an extruder via a sheet die. Accordingly, the device provides the possibility of producing sheets or film sheets with microstructures which stay the same over its thickness.

The device includes at least two units, one each acting upon one surface of the material sheet. The units provide smoothing and cooling, or cooling, and have respectively a base element. The base element has a flat guide surface and two curved deflecting faces continuous with both ends of the flat guide surface. The base also has a metal belt with an outer surface, a lower surface and a width. The width at least corresponds to the width of the material sheet. The metal belt is slidingly supported with its lower surface on the flat guide surface and slidingly guided around the deflecting faces. The outer surface of the metal belt, which is supported by the flat guide surface, forms a flat active area contacting the material sheet. The lower surface of the metal belt is at least partly coolable in a part below the flat active area contacting the surface of the material sheet. A driving roll is present over which the metal belt is guided and drivable. The drive roll drives the metal belt. A drive unit drives the drive roll.

An advantage of this embodiment is that the active area which contacts the material sheet is also designed to be even or flat so that while cooling or smoothing the material sheet, especially when plates are manufactured, no change in the microstructure takes place in a condition of formation, which does not correspond to the final condition, that is a straight plate. A double-sided arrangement relative to the material sheet or plate enables cooling and smoothing in opposite parts so that a symmetrical temperature profile can be achieved and the stress differences can be eliminated. Also, a high transparency is achieved in plastic films or plastic plates. If a larger cooling and smoothing path is required, several base units can be arranged one after the other along the direction of movement of the sheet to be treated. Once achieved conditions are maintained, due to the simultaneous double-sided cooling and smoothing of the material sheet, no temperature change takes place. Also, after exiting of the first station, which is formed of two units, until the entry into the following station, which includes two units, the appearing temperature rise in the peripheral zones takes place symmetrically. Accordingly, there is no difference in the microstructures towards the two surfaces of the sheet.

The small thickness of the metal belt makes tight deflection radii possible. Thus, small distances can be selected with an arrangement of several units one after the other. Accordingly, only small lengths of the material sheet to be treated between two subsequent units are not cooled. Thus, nearly a continuous double-sided cooling is possible over long lengths. Because of this it is possible that cooling lines, which commonly follow smoothing devices of the above described prior art, can be designed immensely shorter or even can be omitted.

An advantage of the solution according to the invention is that an area support is given. Thus, even with smoothing devices, on which foamed plastics are processed, flat (even) surfaces can be achieved. Accordingly, surfaces with fine cells can be achieved since the entry can be designed short due to the tight deflection radii of the metal belt on the base element. This means the uncooled free length, having exited the sheet die of the extruder, can be made very short. The deflecting faces allow a tight spatial allocation to the sheet die.

Preferably, the metal belt has a thickness of equal to or smaller than 0.6 mm. This enables an intensive cooling of the material sheet through a fast heat transfer from the sheet to the metal belt and to the means, which cool the lower surface of the metal belt. Especially advantageous conditions can be achieved when the belt thickness is equal to or smaller than 0.5 mm.

Advantageous cooling of the lower surface of the metal belt is achieved by the base element having cooling channels to transmit a cooling medium. The cooling channels are arranged in the guide surface and/or in the deflection faces of the base element transversely to the direction of the movement of the metal belt. The cooling channels open to the lower surface of the metal belt and are covered by the metal belt. Additionally, seals can be provided near the edges of the belt. The metal belt is slidingly supported on the seals. Alternatively, the cooling channels are in the form of bores in the base element. The bores are arranged in the base element close to the guide surface and/or to the deflecting faces and run transversely to the direction of movement of the metal belt.

An especially advantageous embodiment is achieved when at least two units are provided to form a pair. The two units are arranged opposite each other. The units are provided to take up a material sheet between them. To achieve an adjustment to different material sheet thicknesses, at least one of the units is adjustably mounted in the direction to the other unit. When required, several more pairs of units can be arranged one after the other, along the direction of movement of the material sheet. To achieve optimum conditions, it is further possible that at least one of the units or at least one pair of the units is adjustably arranged along the direction of movement.

From the following detailed description, taken in conjunction with the drawings and subjoined claims, other objects and advantages of the present invention will become apparent to those skilled in the art.

DETAILED DESCRIPTION OF THE PREFERRED EMBODIMENT

Figure 1:
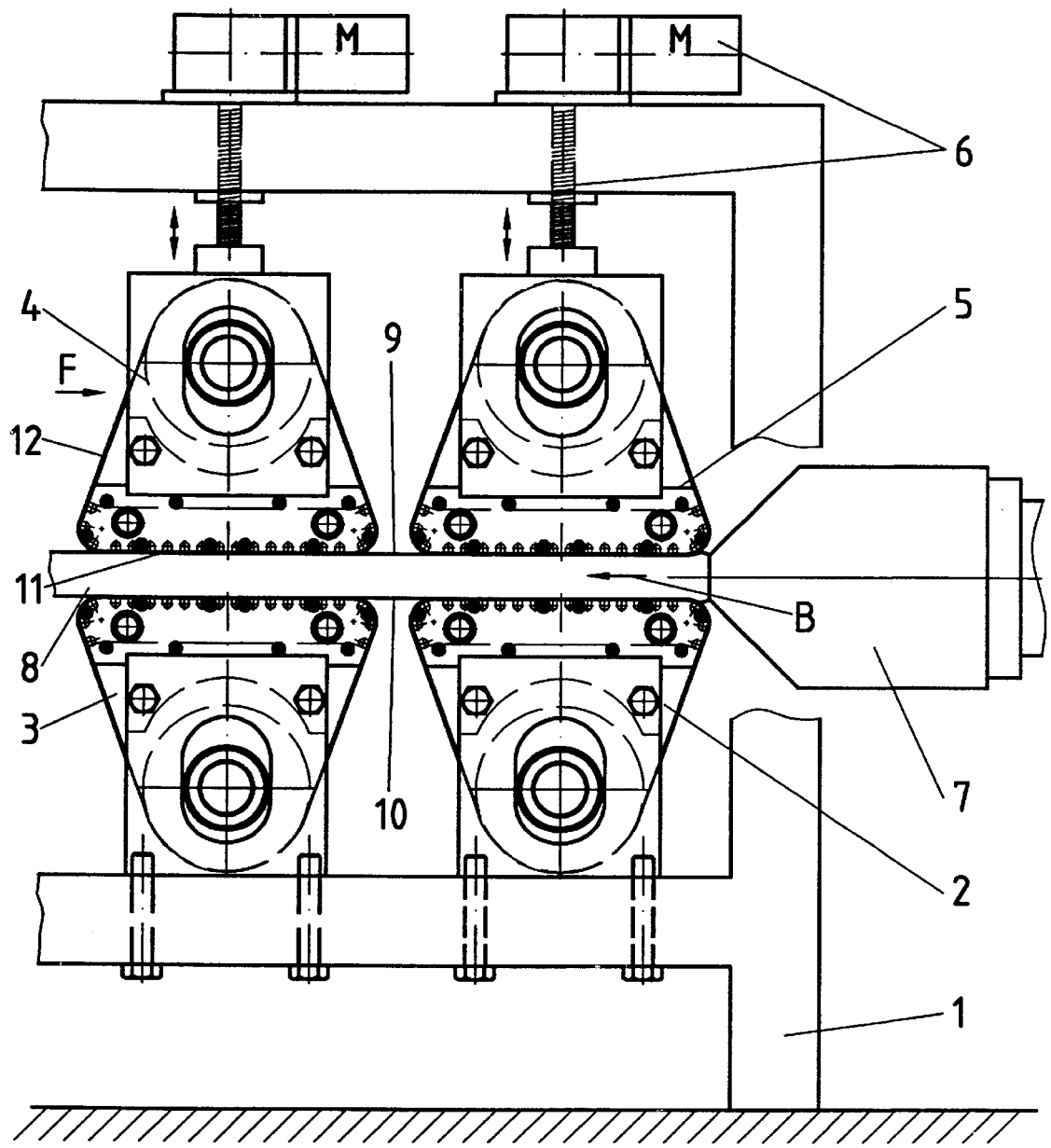
FIG. 1 is a schematic view of a device for smoothing and cooling a sheet material, including four units, which are designed according to the invention.

Four units, namely the units 2, 3, 4, 5, are mounted on the frame 1, as shown in FIG. 1. The two units 2 and 3 are stationary mounted on the frame 1. The two units 4 and 5 are adjustably arranged on the frame 1. Units 4 and 5 can be moved closer to or away from the units 2 and 3. The adjusting mechanism 6 is used to adjust units 4 and 5. An adjusting mechanism is assigned to each one of the units 4 and 5.

The units 2, 3, 4, 5 are designed the same, with the exception of their different arrangement on the frame 1. The units each include a metal belt 12, which has a flat active area 11 at the outer surface. The active area 11 is designed to contact the upper surface 9 or the lower surface 10 of a material sheet 8. The sheet 8 exits a sheet die 7 of an extruder and is guided by the metal belts 12 of the units 2, 3, 4, 5, which are moving in the direction of movement B. The metal belt 12 is cooled, so that the material sheet 8 is also cooled between the respective metal belts of the units 2, 3, 4, 5, which are acting upon the material sheet. To achieve double-sided active cooling on the material sheet, the units are arranged in pairs.

The unit 5 is arranged to directly oppose the stationary unit 2. Unit 4 is arranged opposite to the stationary unit 3. Correspondingly, the active areas of the metal belts of the units 2, 3, 4, 5, forming pairs, oppose each other. Thus, the material sheet 8 is received in-between the units and cooled at respective equal length sections by an upper and a lower unit 2, 5 or 3, 4. The metal belts 12 allow a flat or even design of the active areas 11. The design of a unit can be seen in detail from unit 4, shown in FIGS. 2–4, and will be described with reference to same.

The unit 4 includes a base element 13, which has a flat guide surface 14, to support the lower surface 15 of the metal belt 12. Both ends of the flat guide surface 14 are connected to deflecting faces 16. The deflecting faces 16 are designed with a relatively tight radius. The radius starts at the guide surface 14 and ends in a straight and flat surface, which runs at an angle to the guide surface 14.

Figure 2:
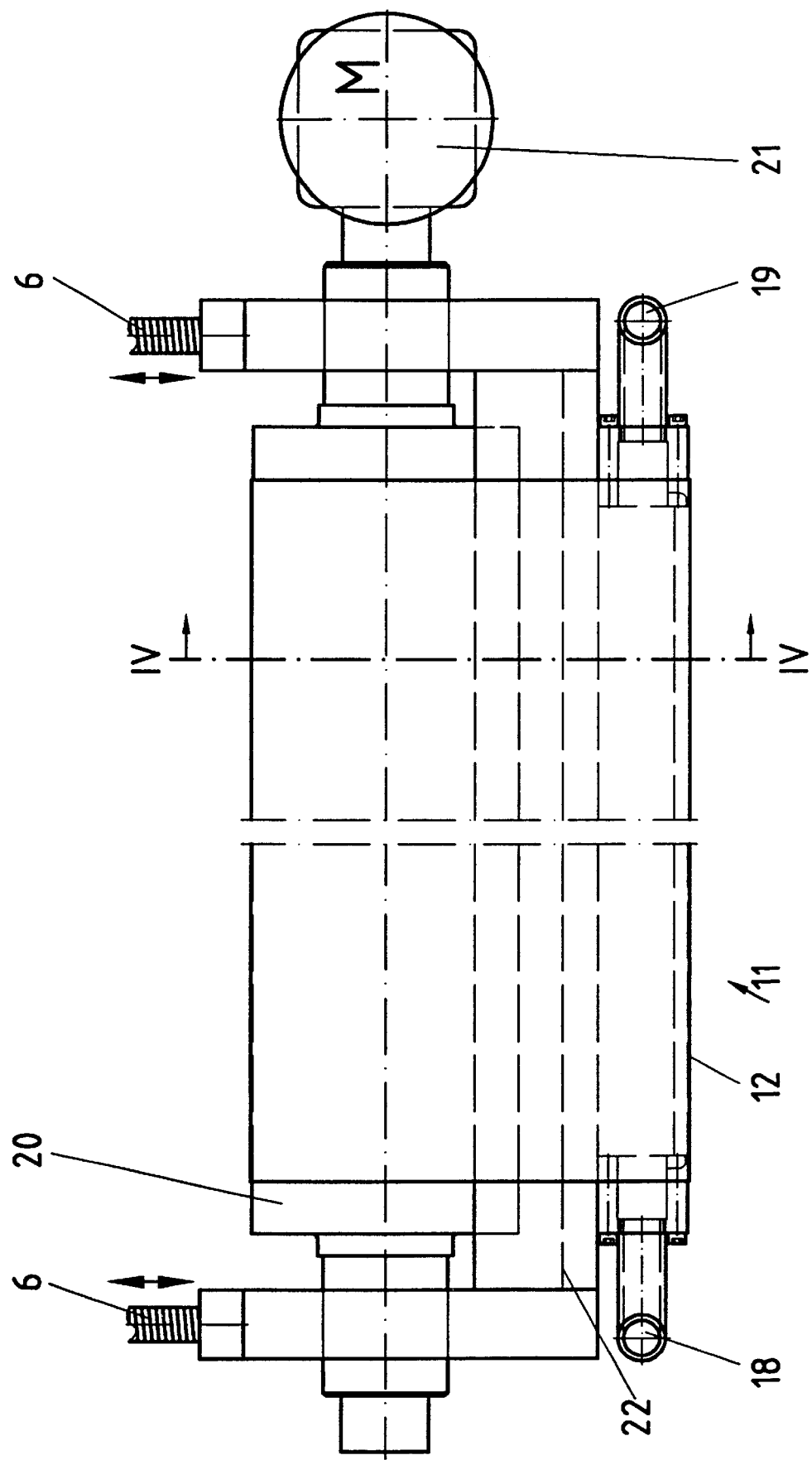
FIG. 2 is an enlarged plan view of a single unit according to the direction of the arrow F of FIG. 1.

A driving roll 20 is arranged at a distance to the guide surface 14. The driving roll 14 is mounted together with the base element 13 on a bracket 22. The bracket 22 is connected to the adjusting mechanism 6, as shown in FIG. 2. The driving roll 20 is rotatably driven by driving unit 21. The metal belt 12 is guided around the driving roll 20 and driven by it.

Figure 3:
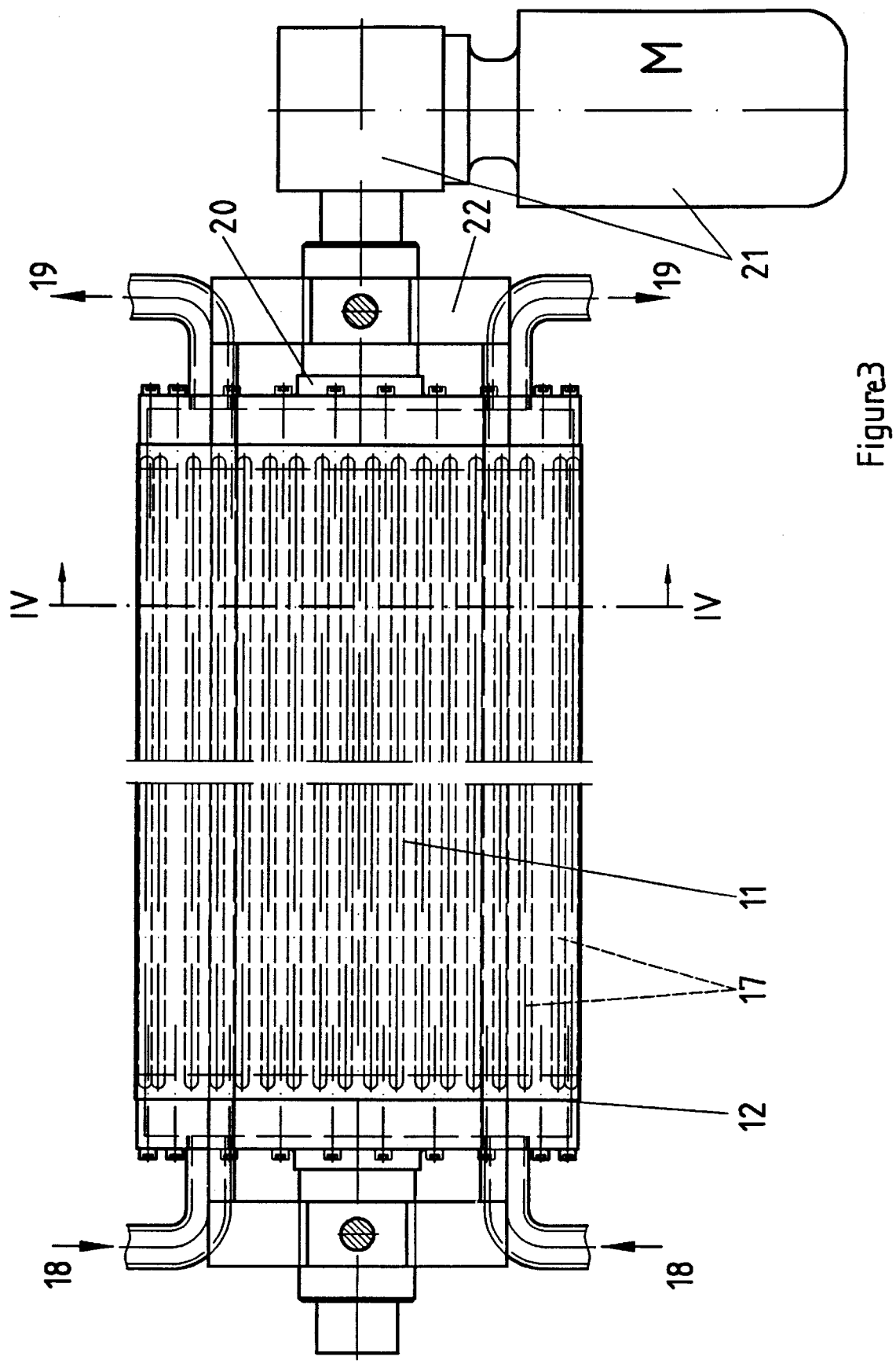
FIG. 3 is a bottom view of FIG. 2.

Cooling channels 17 are formed in the guide surface 14 and in the two following deflecting faces 16. The cooling channels 17 run transversely to the direction of movement B and open to the lower surface 15 of the metal belt 12. A cooling medium, in the form of a cooling liquid, for example water, enters the cooling channels 17, via the inlet 18, and exits via the outlet 19. The cooling medium directly contacts the metal belt 12. As the metal belt 12 is thin, an intensive heat exchange takes place with the material sheet 8, which is in contact with the active area 11. The metal belt 12 is, as shown in FIG. 3, wider than the length of the cooling channels 14, so that a sealing is secured. Additional seals can be provided spaced from the ends of the cooling channels 14. The seals contact the lower surface 15 of the metal belt 12. The driving unit 21 for the driving roll 20 includes a transmission gear and a motor. By selecting the thinnest metal belt 12, very tight deflecting radii can be achieved in the areas of the deflecting faces 16. Thus, in the arrangement, as shown in FIG. 1, the pairs of units 3, 4; 2, 5 can be arranged close to one another in the direction of movement.

Figure 4:
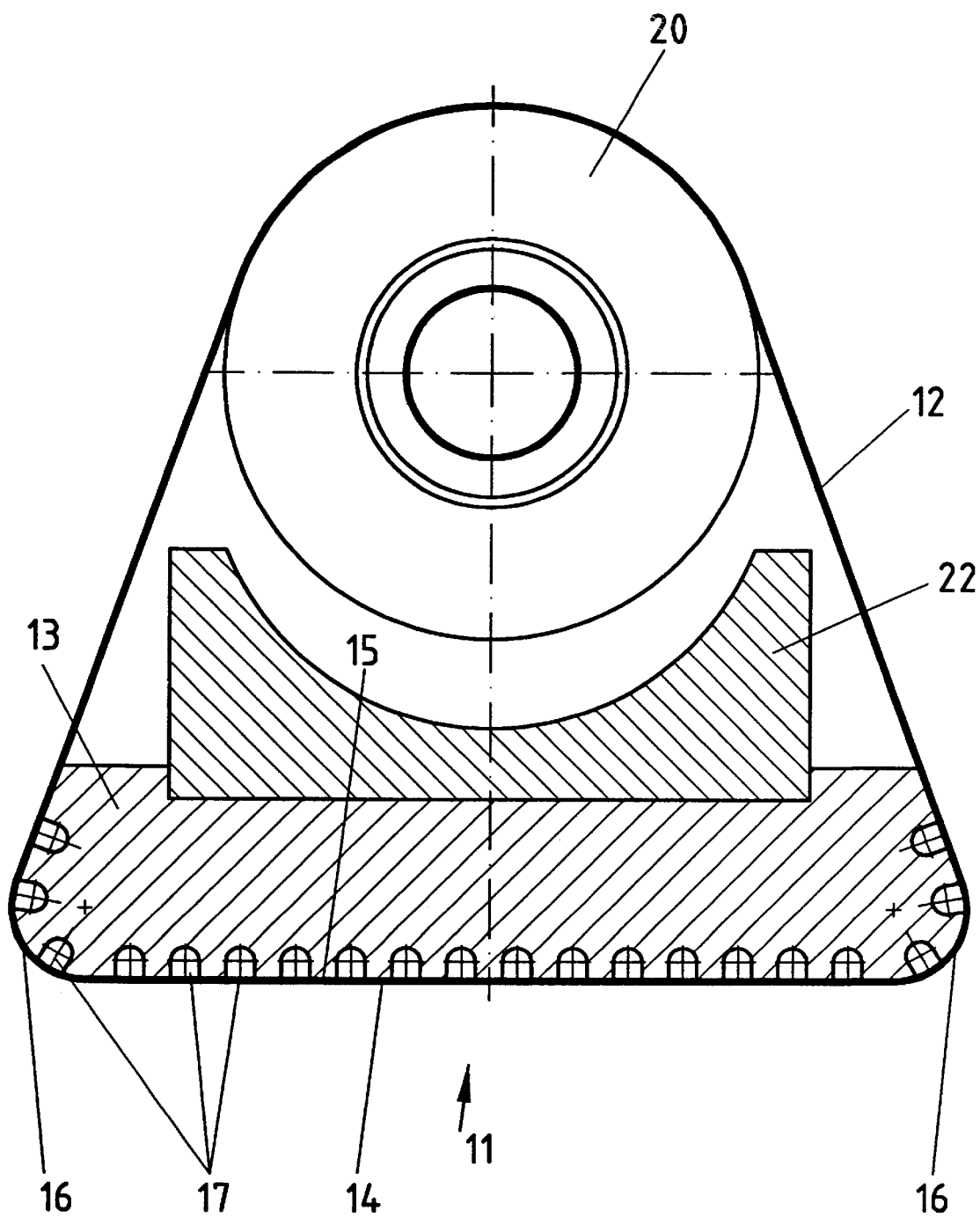
FIG. 4 is an enlarged sectional view according to FIGS. 2 and 3, along line 4—4 thereof.
Figure 5:
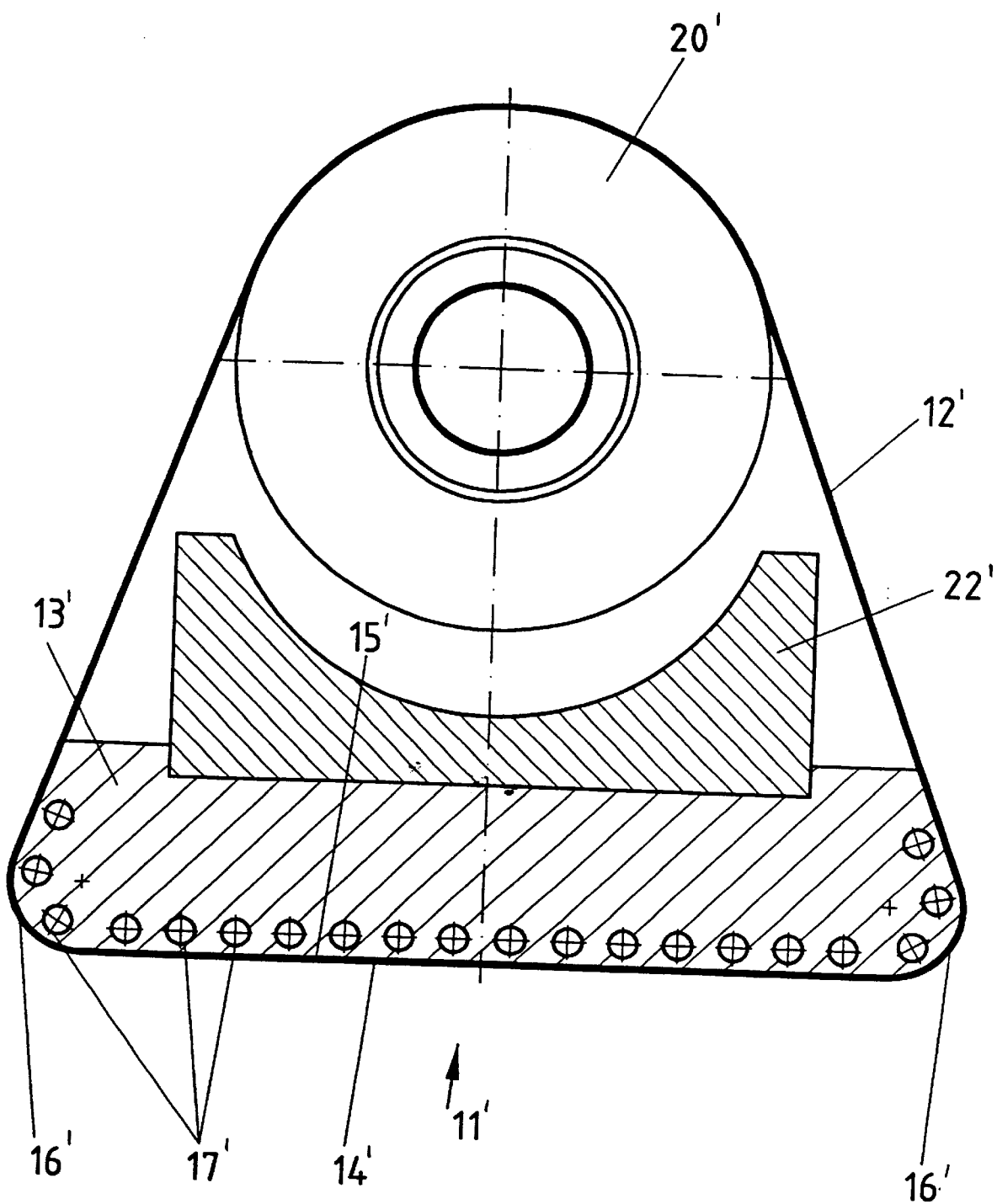
FIG. 5 is a sectional view like FIG. 4 of an alternative embodiment.

FIG. 5 shows a modified embodiment. In the drawing, parts which correspond to those of the embodiment according to FIG. 4 are assigned with reference numerals which correspond to FIG. 4, but provided with a prime. Below, only the modifications to FIG. 4 are described. In the embodiment according to FIG. 5, closed cooling channels 17' are provided in the form of bores. The bores run completely in the base element 13. The bores are respectively arranged close to the guide surface 14' and to the deflecting face 16'. Hence, it is possible to transfer the cooling medium with higher pressures through the cooling channels 17'.

While the above detailed description describes the preferred embodiment of the present invention, the invention is susceptible to modification, variation and alteration without deviating from the scope and fair meaning of the subjoined claims.

What is claimed is:

1. A device for smoothing and cooling or cooling of a material sheet or film which is processed into plates;
   the material made from thermoplastic plastics and extruded by an extruder via a sheet die, comprising:
   at least two units opposing each other and forming a pair for acting on a surface of the material sheet, each one of the units comprising:
   a base element with a flat guide surface and curved deflecting faces continuous with both ends of the flat guide surface;
   a metal belt comprising an outer surface, a lower surface, and a width, the width corresponding at least to the width of the material sheet;
   the metal belt slidingly supported with its lower surface on the flat guide surface and slidingly guided on the deflecting faces, with the outer surface of the metal belt in that portion of the metal belt supported by the flat guide surface forming a flat active area contacting the material sheet and the lower surface of the metal belt at least partly coolable in a part below the flat active area contacting the surfaces of the material sheet;
   a driving roll, said driving roll driving and guiding the metal belt; and
   a drive unit for driving the driving roll.

2. The device according to claim 1, wherein the metal belt has a thickness equal to or smaller than 0.6 mm.

3. The device according to claim 2, wherein the thickness is equal to or smaller than 0.5 mm.

4. The device according to claim 1, wherein the base element has cooling channels for transmitting cooling fluid.

5. The device according to claim 1, wherein cooling channels extending in the guide surface and/or in the deflecting faces of the base element positioned transversely to a moving direction of the metal belt, said cooling channels open to the lower surface of the metal belt and covered by the metal belt.

6. The device according to claim 4, wherein the cooling channels are in the form of bores in the base element and are arranged in the base element adjacent to the guide surface and/or the deflecting faces and run transversely to a moving direction of the metal belt.

7. The device according to claim 1, wherein one of the units is adjustably mounted in the direction to the other unit.

8. The device according to claim 7, wherein more than one pair of the units are arranged along a moving direction one after the other.

9. The device according to claim 8, wherein the more than one pair of the units are arranged adjacent to each other.

10. The device according to claim 8, wherein at least one of the units or at least one pair of units is adjustably arranged along a moving direction.

* * * * *